United States Patent

Sanders

[15] 3,699,571
[45] Oct. 17, 1972

[54] INSTRUMENT LANDING SYSTEM USING A RETRODIRECTIVE SLETTEN ANTENNA RESPONSER

[72] Inventor: Lon L. Sanders, Rolling Hills, Calif.
[73] Assignee: International Telephone and Telegraph Corporation, New York, N.Y.
[22] Filed: Nov. 30, 1970
[21] Appl. No.: 93,731

[52] U.S. Cl. ............................ 343/6.5 R, 343/16 R
[51] Int. Cl. ................................................ G01s 9/56
[58] Field of Search...343/6.5 R, 6.5 C, 6.5 SS, 16 R, 343/16 M, 113 R

[56] References Cited

UNITED STATES PATENTS

| 3,564,543 | 2/1971 | Nehama et al. | 343/6.5 R |
| 3,453,627 | 7/1969 | Lode | 343/113 R |
| 3,500,406 | 3/1970 | Parker | 343/16 R |

OTHER PUBLICATIONS

W. J. Evanzia, " Faster, Lighter 3–D Radars in Sight for Tactical Warfare," Electronics June 27, 1966, pp. 80– 88.

Primary Examiner—Benjamin A. Borchelt
Assistant Examiner—G. E. Montone
Attorney—C. Cornell Remsen, Jr., Walter J. Baum, Paul W. Hemminger, Charles L. Johnson, Jr. and Thomas E. Kristofferson

[57] ABSTRACT

A radar responser (beacon) system including an interrogating airborne station which receives range and angle coded replies from an otherwise quiescent ground station. A Sletten antenna is employed at the ground station because of its relative simplicity and unique output phase relationships as a function of the angle of arrival of a received signal. The angle of arrival information of the Sletten Antenna phase relationship is transposed to audio modulation for retransmission back to the airborne unit. The interrogating pulses are "played back" to an airborne range tracker for range determination, and the Sletten antenna receive signal terminal phase relationship is reduced to the audio domain through the aforementioned modulation process. A relatively simple amplitude detection scheme at the airborne station extracts an angle analog which can be used (typically) for elevation angle information. The system is adapted for the measurement of bearing angles in lieu of elevation angles or may be duplicated for the derivation of analogs of both angular coordinates.

10 Claims, 2 Drawing Figures

INVENTOR.
LON L. SANDERS.
BY William F. O'Neil
AGENT

INSTRUMENT LANDING SYSTEM USING A RETRODIRECTIVE SLETTEN ANTENNA RESPONSER

BACKGROUND OF THE INVENTION

1. Field of the Invention

The invention relates to air navigation systems in general and more particularly, to systems adapted to provide guidance for aircraft (including VTOL) approach and landing.

2. Description of the Prior Art

In the prior art there have been many developments for providing navigational guidance to aircraft. Such systems have been produced for long-range (en route navigation (LORAN, Omnirange, Radar in various forms, etc.), as well as for the relatively more critical problem of providing navigational assistance under low visibility instrument conditions at the time of landing. The urgency of the landing situation has long been recognized as a problem of very high priority, since it critically affects safety and continuity of operation in civil and military aviation.

Existing systems for landing include ILS, GCA, Automatic GCA, and various other active ground and airborne radar systems. A comprehensive reference for reader background which describes most of the widely known prior art navigational aids for aviation is the textbook "Electronic Avigation Engineering" by P. C. Sandretto, published in 1958 by International Telephone and Telegraph Corporation, New York, New York.

One embodiment of the so-called GCA system is described in U.S. Pat. No. 2,975,413 and in its automatic track-while-scan form is typically covered in U.S. Pat. No. 2,980,902.

Various ways have been proposed for using scanning radar for specialized landing assist, however, the relative complication and operating personnel requirements can be seriously disadvantageous in the case of the remote or newly established landing area for aircraft of the VTOL classes. Landing aids for VTOL aircraft in all-weather conditions are of special interest in certain military situations, and are attracting increasing interest in other situations.

In the particular type of device with which the present invention is concerned, a few specific applications are as follows:

a. A landing aid for VTOL fighter/bomber aircraft for use at remote dispersal airfields for parking pads.
b. A landing aid for assault helicopter operations in remote areas previously accessible only by parachute.
c. A landing aid for civil helicopter and VTOL airways operations for use in urban areas.
d. A landing aid for forward area Army airfields or cargo delivery air strips.
e. A landing aid which augments an ILS system or a GCA system at larger well-improved airports.

The above areas of need represent situations where there is a high premium on all weather operations and a large number of potential user aircrafts. None of the above requirements can be effectively satisfied by the existing ILS, GCA or similar systems.

Two relatively new approaches to the general problem are described in copending U.S. patent applications, Ser. No. 23,869, filed Mar. 30, 1970, entitled "Aircraft Electronic Landing Responser System Using Airborne Chirp Interrogation," and also in Ser. No. 23,757 filed Mar. 30, 1970 entitled "Aircraft Electronic Landing Responser System Using Scanning Pencil Beam Ground Antenna". Those applications are assigned to the assignee of this instant case. Those systems, while having their own advantages, do not afford the degree of simplicity and relatively low cost instrumentation provided by the present invention. A prior art discussion of special interest is contained in Electronics Magazine (a McGraw Hill publication) for June 27, 1966, under the title of "Faster, Lighter 3-D Radars in Sight for Tactical Warfare". That article not only provides additional background on modern inertialess scanning techniques, but also describes the comparatively recently developed Sletten antenna which is an element of the system of the present invention. The manner in which the system of the present invention achieves advantages over the prior art will be understood as this description proceeds.

SUMMARY OF THE INVENTION

Basically the present invention is a system for air navigation, particularly air navigation during landing approach. A means is provided for remote angular and range measurement using a remote transponder which encodes the measured angle on the reply signal. The unique combination of interrogation format, ground antenna type and modulation technique make the system highly insensitive to multipath interference, yet simultaneously available to all interrogators within the coverage volume. The present invention provides for these data on an air derived basis. The airborne equipment contains the necessary circuitry for the derivation of range and angle information in cooperation with a fixed normally quiescent ground station.

Those familiar with the prior art in this connection are appreciative of the advantages of providing air derived data.

The ground equipment, also herein referred to as station 1, includes a Sletten antenna and a separate relatively broad coverage transmitting antenna. For convenience and simplicity in this description, only one angle derivation instrumentation is illustrated and described, although it will be understood that this instrumentation can be duplicated for the purpose of providing the other angle. This discussion is arbitrarily directed toward elevation angle derivation, particularly since bearing (azimuth) information is generally less troubled by multiple path interference and accordingly a workable elevation system is readily applicable in azimuth.

The Sletten antenna is a very simple device capable of controlled beam position by simpler hardware than required by other known inertialess scanning antennas, and herein lies an important advantage of the system of the present invention.

Another significant advantage stems from the fact that the Slettin antenna discriminates against multipath signals because of the antenna directivity inherent in the phase of the signals at the antenna terminals. Signals arriving from reflecting objects are rejected by the capture effect in the modulators of the ground equipment.

In accordance with the foregoing, it should be understood that the Sletten antenna at the first station is oriented so as to have a relatively wide fan-shaped radiation pattern in the azimuth plane and a narrow beam-width in the elevation plane. This is essentially the antenna orientation illustrated and described in the aforementioned Electronics Magazine prior art reference. It should be pointed out, however, that the use of the Sletten antenna in connection with the system of the present invention is entirely different from the application of this device described in the prior art in that there is no scan required or desired in connection with the present invention. This contrasts with the prior anticipated uses of the Sletten antenna as a simplified phase-sensitive inertialess scanning antenna. Secondary antennas used for transmitting from the first station and transmitting and receiving at the airborne or second station antenna, are designed to have sufficiently broad coverage to allow for variations of the aircraft approach position.

Basically the second or airborne station transmits a series of interrogation pulses substantially continuously during its approach. These are received by the Sletten antenna at first station and are "replayed" toward the second station through the other antenna at station 1. The airborne equipment, including a receiver and duplexer, receives these retransmitted pulses delayed by an interval equal to the roundtrip transmit time from the second station to the first station and back again to the second station. A range tracker operating on these pulses develops a signal representative of range according to well-known and well-understood techniques.

As is described in the aforementioned Electronics Magazine article, it is a characteristic of the Sletten antenna to receive radio frequency energy from the interrogator (second station) at an angle corresponding to the elevation angle of the aircraft carrying the second station, as measured from the ground (first station) and splitting this received pulse energy into two components which appear at the two terminals or ports of the Sletten antenna line feed. The electrical phase difference between these signal components is uniquely related to the elevation of the interrogation signals. From this point on, the system of the invention is concerned with the encoding of this phase difference and its retransmission or telemetering to the second station in a form easily and simply handled for generation of a direct analog indication in the aircraft. Received energy at the two Sletten antenna terminals is then separately amplified to a suitable level for amplitude modulation and retransmission. Separate amplitude modulators impose 90 and 150 cycle modulation on each of these received energy components. These two amplitude modulated signals are then combined at their power amplified level and are retransmitted via the broader coverage first station transmitting antenna. The instrumentation at the second station demodulates these signals, separates them into 90 and 150 cycle channels and amplitude compares the two for the production of a direct elevation angle analog signal at station 2. The manner in which the modulation of the received phase-separated components at station 1 encodes this phase difference will be described as this description proceeds. The result, and in fact, the general objective of the present invention, may be said to be the development of a radar responser system in which the fixed responser station is quiescent, except when interrogated and which provides substantially instantaneous elevation angle and range coded reply information to the approaching aircraft. Furthermore, it was desired to accomplish this instrumentation with simple and reliable and relatively inexpensive equipment, exploiting the unique capabilities of the so-called Sletten antenna in this unique combination.

DESCRIPTION OF THE PREFERRED EMBODIMENT

Figure 1:
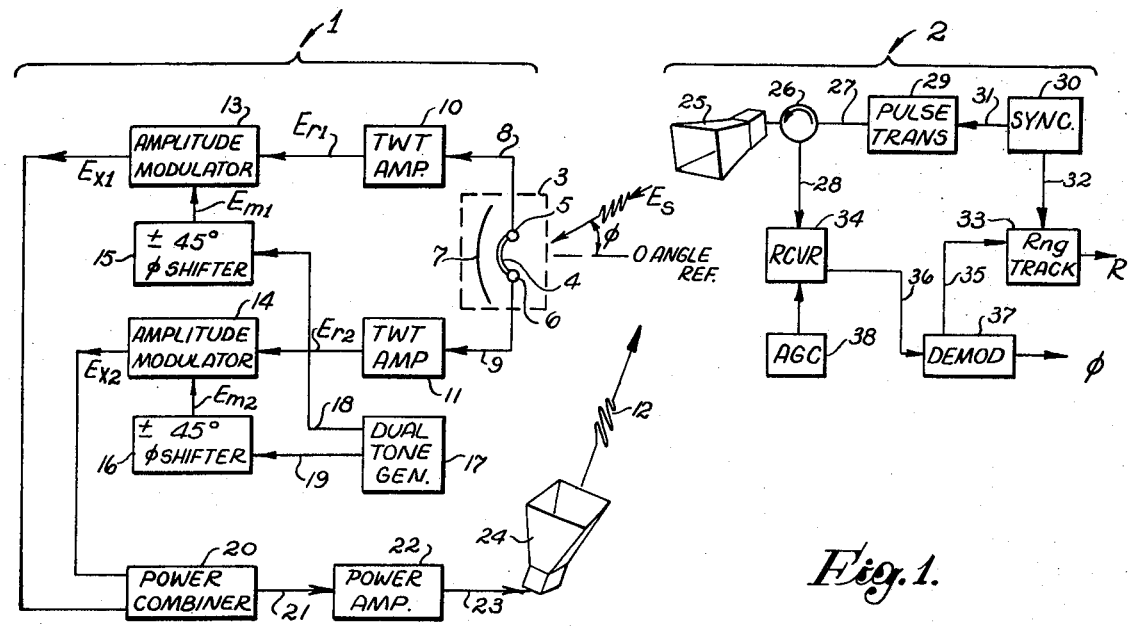
FIG. 1 is an overall system block diagram including ground and airborne stations in accordance with the present invention.

Referring now to FIG. 1, it will be noted that the ground equipment (first station) is illustrated generally at 1, and the airborne (second station) equipment is illustrated generally at 2. The first station equipment is normally quiescent, that is, at times other than when it is being interrogated, the said first station does not transmit.

Since only the angle determining instrumentation for one angular coordinate is illustrated, the description will be carried out on the assumption that the elevation angle is being measured, as hereinbefore indicated. Accordingly, there is assumed to be a solid wedge of space having its vertex at the first station on the ground and extending outwardly through the landing approach zone. The Sletten antenna assembly 3 thus is designed and oriented to provide a fan-shape radiation pattern in the azimuth plane in accordance with the characteristics of the reflector 7, and a narrow beam width in the elevation plane.

The ground station transmitting antenna 24 and the airborne transmitting antenna 25 are illustrated as microwave horns which are readily constructed to have a sufficiently broad coverage in vertical and horizontal planes to insure that an aircraft within the limits of the horizontal and vertical coverage of the Sletten antenna 3 would be "heard" by it. Similarly, the coverage of the antenna 24 is such as to insure that the airborne antenna 25 could receive energy (represented by 12) from it wherever the aircraft might be located within the said approach zone. Functionally, omnidirectional antennas could be used in lieu of horns 24 and 25, however, the horns are more efficient, provide better radiation security and less probability of interferences with other electronic equipment within range.

Although there is no scanning action involved in the present system, it may be said that the Sletten antenna 3 is oriented as it would be for vertical scanning. Thus, interrogation energy ($E_a$) transmitted from the second station arriving at an angle $\phi$ produces received energy at the Sletten antenna terminals 5 and 6 at opposite ends of the Sletten feed 4. The electrical phase difference between these two signals at terminals 5 and 6 is uniquely related to the elevation angle of the receive signal $E_a$, as hereinbefore indicated.

Before describing the ground processing of this received energy, it is desirable to discuss certain aspects of the second station (airborne) equipment.

The second station equipment generally labeled 2, transmits interrogation pulses from antenna 25. A synchronizer 30 operates as a basic timing circuit producing a train of pulses at a repetition frequency such as 3 khz. As will be observed later, this repetition frequency is established an order of magnitude or more above the highest modulation frequency employed. Synchronizer 30 has outputs 31 and 32 providing pulses at same pulse repetition frequency. Pulses on 32 differ from those on 31 only in that they lead slightly in time to accommodate the operation of the range tracker 33, to be discussed later. The pulse transmitter 29 generates a corresponding chain of radio-frequency pulses in response to the triggering pulses on 31. Thus a radio-frequency train of pulses proceeding on lead 27 passes through duplexer 26 to antenna 25 for radiation. In accordance with standard duplexer operation, substantially all of the energy on lead 27 passes to the antenna 25 during transmission, however, received energy at 25 is channeled by the duplexer 26 on to lead 28 toward the receiver 34 and not into lead 27.

Interrogation pulses transmitted from the second station are generally identified as $E_s$ and are received at an elevation angle $\phi$ (with respect to an arbitrary elevation angle reference established at the Sletten antenna 3 of the first station). As a result of this reception, energy appearing on leads 8 and 9 is separated in phase as a function of this elevation angle $\phi$. The function of the remainder of the equipment at the first station, at least in respect to angle determination, concerns the encoding of this phase difference between 8 and 9 in a form which is readily decodable at the second station.

Since the signals on 8 and 9 are typical low received energy levels, amplifiers 10 and 11 are provided to boost these signals to a retransmittable power level. These power amplified signals are identified as $Er_1$ and $Er_2$ in FIG. 1. The power amplifiers 10 and 11, typically travelling wave tube amplifiers, are designed such that the additional phase shift they introduce is small and equal in the two channels.

The amplified received signals $Er_1$ and $Er_2$ are then applied respectively to the amplitude modulators 13 and 14, respectively. These amplitude modulators yield modulated signals $Ex_1$ and $Ex_2$ respectively, after they are modulated by modulation signals $Em_1$ and $Em_2$.

The dual tone generator 17 generates a pair of modulation signals in the low audio frequency domain. Typically, these signals might be 90 and 150 cycles. Those particular tones were chosen for ILS transmission in the prior art and they are appropriate for the present device. The reader skilled in this art will recognize the similarity between the tone generation and modulation technique employed in FIG. 1 to that of the said ILS system, notwithstanding the fact that the system function of the ILS equipment differs entirely from that of the present invention.

The outputs 18 and 19 of the dual tone generator actually each include both tones, that is, components of both of the 90 and 150 cycle signals. Leads 18 and 19 should be thought of as two leads each in that both the 90 and 150 cycle tones are provided to each of the 15 and 16 phase shifters. Each of the phase shifters, or splitters, 15 and 16, provides two components for each frequency separated by 90°. Thus, the modulation signals $Em_1$ and $Em_2$ result from combinations of phase shifted components of the two tones, the process and nature of the signals produced being best described by Equations I and II for $Em_1$ and $Em_2$ respectively, as follows:

$$Em_1 = \cos\left(\omega_{90}t + \frac{\pi}{4}\right) + \cos\left(\omega_{150}t - \frac{\pi}{4}\right)$$

Equation I $$Em_2 = \cos\left(\omega_{90}t - \frac{\pi}{4}\right) + \cos\left(\omega_{150}t + \frac{\pi}{4}\right)$$

Equation II

In accordance with the foregoing it will then be seen that the amplified received signal $Er_1$ is modulated in 13 in accordance with Equation I and the signal $Er_2$ is modulated in 14 in accordance with Equation II. The signals $Ex_1$ and $Ex_2$ are therefore amplitude modulated trains of pulses at the representative 3000 khz repetition frequency. The pulses are at the radio frequency of $E_s$ of course. It will now be understood why it is necessary for the interrogation pulse repetition frequency to be large compared to the frequency of the aforementioned modulation tones. The envelope of the pulses themselves in unmodulated form may be thought of as a subcarrier for the modulation tones.

The signals $Ex_1$ and $Ex_2$ will be seen to be combined in the power combiner 20 to produce a con-composite transmittable signal at 21 which is further power amplified as necessary at 22 and conveyed via 23 to the broad pattern ground station antenna 24 which retransmits a signal toward the airborne or second station in accordance with Equation III as follows:

$$Ex_1 + Ex_2 = E\left[2\cos\phi\cos\omega_c t + \cos(\omega_c - \omega_{90})t\cos\left(\phi - \frac{\pi}{4}\right) + \cos(\omega_c - \omega_{150})t\cos\left(\phi + \frac{\pi}{4}\right)\right],$$

Equation III where $\omega_c$ refers to the radio frequency carrier.

Observation of Equation III indicates that the upper sidebands which would normally be generated in the modulation process, are absent. This is because the modulation accomplished in 13 and 14 is of the vestigal sideband type, so that only the carrier and the lower sidebands will remain.

Referring again to the second station 2 of FIG. 1, it will be noted that the modulated retransmission from antenna 24 is transmitted at 12 toward antenna 25 at the second station. At the second station it passes through the duplexer 26 and via lead 28 is supplied to the receiver 34. Since a relative amplitude determination is to be made for the extraction of the angle $\phi$, it is very desirable for the receiver 34 to be stabilized gainwise by an automatic gain control circuit 38. The time constant and settle-down requirements for the AGC 38 are not stringent since there is no scan modulation problem to be considered. During operation the interrogation pulses and the modulated pulse train replies are both continuously produced throughout the landing approach procedure. The demodulator 37, which ultimately produces the analog signal $\phi$ is depicted in more detail in FIG. 2.

Figure 2:
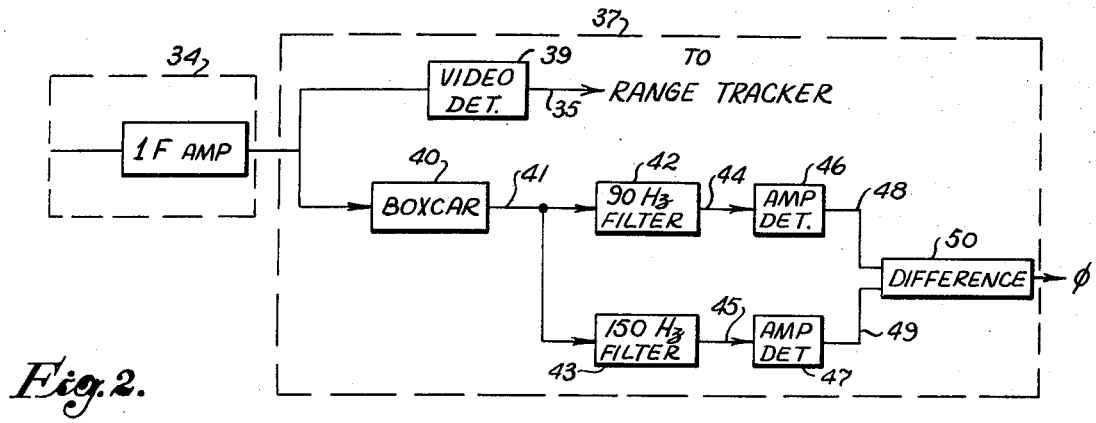
FIG. 2 is a detailed block diagram of the demodulator of the airborne station of FIG. 1.

Referring now to FIG. 2, the receiver output lead 36 from receiver 34 will be seen to convey signals at IF frequency. In the demodulator 37 these signals are routed two ways. Considering first the angle determination circuits, the signal on 36 will be seen to be applied to boxcar detector 40. This circuit 40 has the effect of stretching between successive pulses and thereby smoothing out the modulated signal curve. The application of such a circuit is well known in this art and an analogous use in connection with MTI radars is described in Section 4.4, Chapter 4, of the textbook "Introduction to Radar Systems" by Merrill I. Skolnik, a McGraw Hill book (1962).

After passing through the boxcar circuit 40, the so-called smoothed output 41 is applied in parallel to filters 42 and 43 tuned to pass the 90 and 150 cycle vestigal sidebands, respectively. From these, the corresponding outputs 44 and 45 are applied to amplitude detectors 46 and 47, respectively, providing simple amplitude representative output signals at 48 and 49. A straightforward differencing or subtraction circuit 50 accordingly provides the output analog directly representative of the angle $\phi$. Since this computation takes place at the second station, i.e., in the air, it is said that the angle information is air derived. The said $\phi$ analog signal may be applied to a standard cross-pointer meter (not shown) similar to the indicator device used in the standard ILS airborne equipment. Other means of presenting angle information are, of course, possible.

The operation of the system for determination of range or the range analog signal r, from FIG. 1, remains to be explained.

In describing the nature of the signal radiated toward the second station from the ground antenna 24, it was apparent that an amplitude modulated train of individual pulses was extant. It was also pointed out that the pulse repetition frequency is necessarily considerably greater than the frequency of the highest of the dual tones. The frequency of pulse repetition is limited on the upper end however, by the maximum range requirement. Basically, the ranging information and the range analog signal r comes from measurement of the delay of individual pulses in the interrogation pulse train on its round trip from the second station to the first and back again to the second. The approach zone for equipments of the type of the present invention is generally not much more than 10 or 12 miles in range; accordingly, the pulse repetition frequency from synchronizer 30 must be lower than the reciprocal of the air/ground two-way transit time at that maximum range. The 3,000 khz repetition frequency is consistent with that requirement in this type of system.

Noting that individual pulses radiated from the ground antenna are are time delayed from the corresponding interrogation pulse from antenna 25 by an amount proportional to the range, it will be obvious that a simple range-tracking operation as provided by the circuit 33 is capable of producing a range analog signal. For this purpose, the range tracking circuit 33 is fed the delayed received pulses passed through an ordinary linear video detector 39 within the receiver 34 via lead 35. The undelayed synchronizing pulses of the same frequency from synchronizer 30 are also supplied to 33 via lead 32. Actually, in order to accommodate the operation of a range tracker 33 of a known type, the synchronizing pulses on 32 are usually required to lead the transmitter synchronizing pulses 31 slightly in order to allow for inherent tracker circuit delays and normal calibration functions.

The range tracker 33 may be implemented in accordance with the teachings of U.S. Pat. No. 2,795,781 or any of a variety of standard textbooks on radar techniques.

Since, for range tracking purposes, a continuity of pulses radiated from the ground antenna 24 is required, it follows that something substantially less than 100 percent modulation introduced at 13 and 14 is appropriate. The system may be expected to function reliably with modulation percentages of 50 percent or less.

While the foregoing description details a typical implementation of the present invention, it will be obvious to those skilled in the art, that certain modifications and variations are possible in the spirit of the invention. Accordingly, it is not intended that the scope of the present invention should be considered to be limited by the drawings or this description, which are to be regarded as illustrative and typical only.

What is claimed is:

1. A radar responser system for determining at least an angle at which said second station is located with respect to a first station; interrogation means within said second station for transmitting relatively a train of short radio frequency interrogation pulses at a predetermined repetition frequency; a Sletten antenna at said first station for receiving said interrogation pulses from said second station, said Sletten antenna having first and second received signal terminals at which energy of the received radio and pulse repetition frequencies is extant, the phase difference between said terminals being a function of said angle;

first and second amplitude modulators connected for modulating said energy from said first and second terminals respectively;

means for supplying said first amplitude modulator a first low frequency modulation signal to modulate energy from said first signal terminal and for supplying said second amplitude modulator a second low frequency modulation signal to modulate energy from said second signal terminal;

combiner means for combining the modulated outputs of said amplitude modulators;

antenna means for radiating said combiner output in a pattern capable of being received at said second station;

receiving means at said second station for reproducing said interrogation pulse train amplitude modulated by said combined first and second low frequency modulation signals;

and means responsive to said receiving means for separately detecting said first and second modulation signals and comparing their relative amplitudes to generate a signal which is a function of said angle.

2. Apparatus according to claim 1 including radio frequency power amplification means between each of said received signal terminals and the corresponding one of said amplitude modulators.

3. The invention set forth in claim 2 including a pulse generator within said interrogation means at said second station for generating control pulses to time the generation of said radio frequency interrogation pulses, and a range tracking circuit responsive to said control pulses and said receiving means at said second station to produce a distance analog signal.

4. The invention set forth in claim 2 in which said interrogation pulse repetition frequency is high compared to either of said first and second low frequency modulation signals.

5. Apparatus according to claim 4 in which said first station is defined as a fixed station, said second station is located on a movable vehicle and said receiving means at said second station includes antenna means having a directivity pattern permitting transmissions to and reception of transmissions from said first station over a predetermined range of positions for said vehicle.

6. The invention according to claim 5 in which said antenna means forming a part of said second station receiving means is connected to said interrogation means and said receiving means through duplexing means whereby said second station transmits during generation of each discrete interrogation pulse and may receive transmissions from said first station at other times.

7. Apparatus according to claim 6 in which said means for detecting said first and second modulation signals and comparing their relative amplitudes at said second station includes a boxcar detector responsive to said second station receiving means, first and second bandpass filters tuned to said first and second low frequency modulation signals respectively, first and second amplitude detection means connected to the outputs of said first and second filters respectively and means for differencing the outputs of said amplitude detectors to produce said signal which is a function of said angle.

8. Apparatus according to claim 7 in which said first and modulation signal comprises ±45° phased components and said second modulation signal comprises ±45° phased components, and said modulation at said first station is of the vestigal sideband type.

9. The invention set forth in claim 8 in which said first station is defined as a fixed ground station, said second station is defined as airborne and said angle is the elevation angle of said second station with respect to said first station.

10. Apparatus according to claim 9 further defined in that said first and second low frequency modulation signals are 90 and 150 cycles respectively, and said interrogation pulse repetition frequency is at least ten times said second modulation signal frequency.

* * * * *